June 22, 1943.  C. B. POWLEDGE  2,322,388
BATTERY TERMINAL
Filed Dec. 14, 1942
Fig. 1.
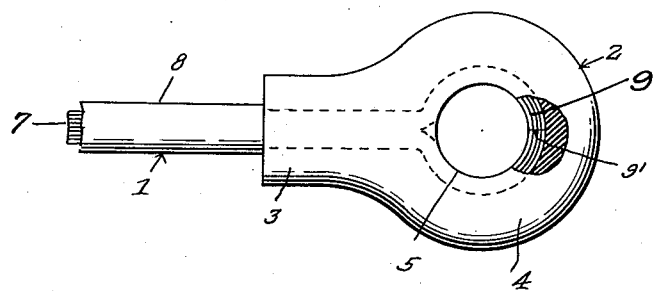
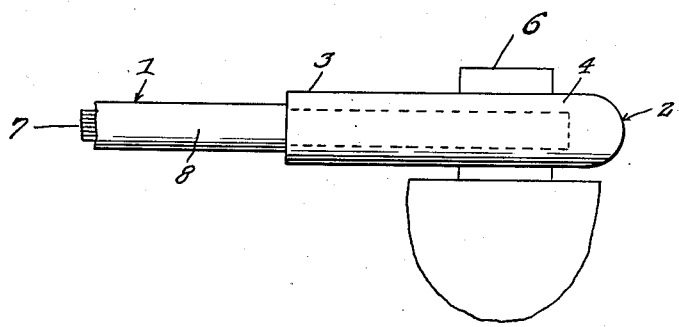
Fig. 2.
Inventor
Carl Barnes Powledge
By Clarence A. O'Brien
and Harvey B. Jacobson
Attorneys Patented June 22, 1943

2,322,388

UNITED STATES PATENT OFFICE 2,322,388

BATTERY TERMINAL

Carl Barnes Powledge, Norfolk, Va.

Application December 14, 1942, Serial No. 468,965

1 Claim. (Cl. 173—259)

My invention relates to improvements in battery terminals for connecting battery cables to the posts of batteries, the principal object in view being to provide a terminal which is adapted to be easily and quickly applied to the post without bolts, screws, or the like, and which provides for a tight connection and prevents acid from corroding the connection, is easy to remove, tends to tighten under vibration, instead of loosen, and is simple in construction, durable and inexpensive to manufacture.

To the accomplishment of the above, and subordinate objects presently appearing, a preferred embodiment of my invention has been illustrated in the accompanying drawing, set forth in detail in the succeeding description, and defined in the claim appended hereto.

In said drawing:

Figure 1 is a view in plan, partly broken away, of my improved battery terminal in its preferred embodiment, and Figure 2 is a view in side elevation.

Referring to the drawing by numerals, according to my invention, a battery cable 1 is provided with a terminal coupling 2 of rubber, or rubber composition, including a short cylindrical shank 3 and an enlarged eyelet-like head 4 having a central circular opening 5 therein of substantially the same size as a battery post 6. The wires 7 of the cable 1 are extended out of the insulation covering 8 through the shank 3 and formed into a circular loop 9 of overlapping wires with butt joints 9', said loop being of the same internal diameter as the opening 5 and embedded in the head 4 concentrically of the opening 5. To incorporate the wires and loops 7 in the coupling 2, the cable 1 may be stripped of insulation for a suitable distance from its terminal end and the extremities of the wires suitably bent to form the loop 9. The coupling 2 may then be molded around the wires and said loop 9.

To attach the described coupling to the battery post 6, it may be forced down over the post over a flared tube, not shown, placed over said post, the coupling then held down, and the tube pulled out of the coupling.

As will be seen, since the coupling is of reactive material, the loop 9 will be compressed tight around the post 6 by reaction of the coupling and sufficiently to tightly hold the same on the post, and further that said coupling may be easily pried off said post in changing batteries and by means of any suitable tool.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

A battery terminal comprising a coupling of resilient insulation material including a shank and an eyelet-like head on said shank defining a circular aperture, and a stranded conductor extending through said shank and terminating in a closed loop embedded in said head concentrically of said aperture and having an inside diameter corresponding to the diameter of said aperture, said loop being formed of overlapping strands having abutting ends.

CARL BARNES POWLEDGE.